Patented May 18, 1948

2,441,793

UNITED STATES PATENT OFFICE 2,441,793

STABILIZATION OF ALKYLENE GLYCOLS

Edgar C. Britton and Arthur R. Sexton, Midland, Mich., assignors to The Dow Chemical Company, Midland, Mich., a corporation of Delaware No Drawing. Application August 6, 1945,
Serial No. 609,317

7 Claims. (Cl. 252—77)

This invention relates to stabilizing lower alkylene glycols against thermal decomposition.

In certain types of air craft and automotive engines, the liquid coolant, instead of running at the conventional temperature of 100° C. or less, commonly circulates at 150° C. in a closed system, and may occasionally reach 200° C. or higher, perhaps for an extended period. The problem of selecting a coolant which will operate satisfactorily at these temperatures and yet will not freeze even at extreme winter temperatures is a difficult one. Ethylene glycol, undiluted or together with a lesser proportion of water, is most frequently chosen as the coolant, but it has the undesirable property of decomposing slowly at the higher temperatures mentioned to form organic acids, carbon, and gummy tars. These acids, when formed, tend to corrode the metallic parts of the circulating system, and the carbon and tar ultimately foul the heat-transfer surfaces and throttle circulation. In consequence, with ethylene glycol coolants, periodic overhauling of the circulating system is necessary, sometimes at short intervals.

In an effort to provide a more satisfactory liquid coolant for operation at high temperatures, it has now been found that the lower alkylene glycols, such as ethylene glycol, may be stabilized against thermal decomposition of the type mentioned by incorporating therein a small proportion of 1,4-piperazinediethanol. This compound almost completely restrains thermal decomposition of the glycols, both in the undiluted state and in mixtures thereof with the same or a lesser weight of water, at temperatures up to 200° C., and very markedly retards decomposition even when the glycols are maintained liquid under pressure at temperatures as high as 300° C.

Glycol compositions stabilized in accordance with the invention not only are useful as coolants for internal combustion engines but are satisfactory as liquid heat-transfer agents in general at temperatures within the range mentioned. They are characterized by extremely low freezing points, good heat-transfer characteristics, and moderate viscosities, as well as thermal stability. The compositions may also be used as fluid pressure- and power-transmitting media.

The lower alkylene glycols to which the invention is applicable contain from two through five carbon atoms per molecule. Of these, ethylene glycol, and to a lesser extent industrial mixtures of propylene glycols and of butylene glycols, are of present commercial interest. Such glycols may be employed according to the invention in the undiluted state or mixed with an equal or lesser weight of water. With larger proportions of water, the boiling points of the solutions are somewhat low for a high temperature fluid, and thermal decomposition is rarely a serious problem.

The 1,4-piperazinediethanol is soluble in the undiluted glycols and their aqueous mixtures to a limited extent and may be incorporated in them simply by stirring in the crystals of the stabilizer. More conveniently, it may be made up as a strong solution in a mutual solvent, such as alcohol, and the solution stirred into the glycol composition. A small proportion of the 1,4-piperazinediethanol is all that is required to effect stabilization, 0.2 to 5 per cent by weight of glycol present being preferred.

The 1,4-piperazinediethanol, in addition to preventing carbon and tar formation, minimizes corrosion of metals by heated glycols and glycol-water mixtures by virtue of the fact that it almost completely restrains development of acidic substances by decomposition of the glycols. It also functions to a moderate degree as an inhibitor in the conventional sense of retarding the corrosion of metals by other agents, such as air, which may be dissolved in the glycol solution. However, when extremely corrosive conditions are to be encountered, it is preferable to rely on the 1,4-piperazinediethanol as a thermal stabilizer only and to introduce in addition a small proportion of a conventional corrosion inhibitor. Since many such inhibitors are themselves unstable or volatile at temperatures of 200° to 300° C., it is important to select an inhibitor which is not affected adversely by heating. Sodium silicate, usually from 0.5 to 5 per cent by weight of the glycol, is a preferred choice.

While the heat-transfer media of the invention ordinarily consist of the glycol and the stabilizer, with or without water, minor proportions of other ingredients such as anti-foaming agents, leak-stopping compounds, and dyes, as well as the conventional inhibitors already mentioned, may be added as desired.

The following examples will serve to illustrate the invention, but are not to be construed as limiting its scope. In the examples, a testing apparatus was employed consisting of an electrically heated closed iron chamber of about 400 cc. capacity and a circulating system for withdrawing the liquid being tested from a reservoir, forcing it under a pressure of 100 to 120 pounds per square inch into one end of the heated chamber, removing it from the other end of the chamber through a relief valve, cooling it, and returning it to the reservoir. The rate of circulation was controlled at about 800 cc. per hour. Polished test specimens of aluminum, iron, brass, and copper were placed in the heated chamber throughout each run. The purposes of the metal specimens were to have present in the system the metals normally used in liquid-cooled engines, and also to observe the rates of corrosion of the metals.

*Example 1.—Aqueous mixture at 200° C.*

In a blank run, the system was filled with 2565 cc. of a mixture of 70 parts by weight of ethylene glycol and 30 parts of water, containing no stabilizer; the pH of this mixture was 7.3. The heated chamber was maintained at 200° C., circulation being continued for 100 hours. The metal test specimens present in the chamber were weighed at the start of each run and were reweighed, after polishing, at the end of the run. The losses in weight were calculated as milligrams per hour per square inch of exposed surface. At the end of this run, the solution contained a large number of rust particles, had a decided aldehyde odor, and had become acidic, the pH being 5.8. In addition, carbon had deposited on the walls of the chamber. The corrosion rates of the test specimens were: aluminum, 0.01; iron, 0.00; brass, 0.02; and copper, 0.03.

In a comparative test in accordance with the invention, the system contained 2320 cc. of a mixture of 70 parts of ethylene glycol, 30 parts of water, and 0.5 part of 1,4-piperazinediethanol, the initial pH of which was 8.7. This mixture was also circulated for 100 hours with the chamber at 200° C. At the end of this period, the solution was entirely clear and free of particles, had no aldehyde odor, and was still basic, the pH being 8.0. There was no formation of carbon or tar in the chamber. The corrosion rates of the test specimens were: aluminum, 0.01; iron, 0.00; brass, 0.02; and copper, 0.01.

*Example 2.—Undiluted glycol at 300° C.*

In a blank run, the system was charged with 1020 cc. of undiluted ethylene glycol containing no inhibitor, the pH of the glycol being 7.0. The chamber was maintained at about 300° C., circulation being continued for 12.5 hours, at which time it had to be stopped because of excessive deposition of carbon and tar in the heated chamber. The glycol was dark brown in color, had a strong aldehyde odor, and was acidic, the pH being 5.8. The metal test specimens were so coated with carbon that corrosion rates could not be determined.

In a comparative test according to the invention, the system contained 2250 cc. of undiluted ethylene glycol containing 0.5 per cent by weight of 1,4-piperazinediethanol, the pH of the mixture being 8.2. This liquid was circulated for 100 hours with the chamber at about 300° C. At the end of this interval the solution was entirely clear, and had no aldehyde odor, but had turned a light reddish color; the pH was 7.8. No carbon had formed, and there were only slight traces of a light tar in the chamber. The metal corrosion rates were: aluminum, 0.04; iron, 0.09; brass, 0.05; and copper 0.00.

It will be appreciated that both Examples 1 and 2 represent considerably more severe conditions than are usually encountered in practice. The marked stabilizing action of the 1,4-piperazinediethanol, and the low corrosion rates of the metal specimens, are clearly evident.

What is claimed is:

1. A heat-transfer medium consisting essentially of a lower alkylene glycol containing from 2 through 5 carbon atoms per molecule and not over an equal proportion by weight of water, stabilized against thermal decomposition by 1,4-piperazinediethanol in a proportion of from 0.2 to 5 percent by weight of the glycol.

2. A heat-transfer medium chemically stable at elevated temperatures consisting essentially of ethylene glycol and from about 0.2 to about 5 per cent by weight thereof of 1,4-piperazinediethanol.

3. A liquid heat-transfer medium chemically stable at elevated temperatures consisting essentially of one part by weight of ethylene glycol, not over one part of water, and 0.002 to 0.05 part of 1,4-piperazinediethanol.

4. In a process wherein a heat-transfer medium consisting essentially of a lower alkylene glycol containing from 2 through 5 carbon atoms per molecule and not over an equal proportion by weight of water is heated as a liquid for a prolonged period at an elevated temperature, the method of minimizing thermal decomposition of the liquid which comprises maintaining dissolved therein 1,4-piperazinediethanol in a proportion of from 0.2 to 5 per cent by weight of the glycol.

5. In a process wherein a lower alkylene glycol containing from 2 through 5 carbon atoms per molecule is heated as a liquid for a prolonged period at an elevated temperature, the method of minimizing decomposition of the liquid which comprises maintaining dissolved therein from 0.2 to 5.0 per cent by weight of 1,4-piperazinediethanol.

6. In a process wherein ethylene glycol is heated as a liquid at an elevated temperature of at least 200° C., the method of minimizing decomposition of the liquid which comprises maintaining dissolved therein from 0.2 to 5 per cent by weight of 1,4-piperazinediethanol.

7. In a process wherein a liquid mixture of ethylene glycol and a lesser proportion of water is heated at an elevated temperature of at least 200° C., the method of minimizing decomposition of the liquid which comprises maintaining dissolved therein 1,4-piperazinediethanol in a proportion of from 0.2 to 5 per cent by weight of the glycol.

EDGAR C. BRITTON.
ARTHUR R. SEXTON.

REFERENCES CITED

The following references are of record in the file of this patent:

UNITED STATES PATENTS

| Number | Name | Date |
|---|---|---|
| 1,903,287 | Cox | Apr. 4, 1933 |
| 1,988,584 | Dana et al. | Jan. 22, 1935 |
| 2,060,138 | Taylor | Nov. 10, 1936 |
| 2,078,256 | Lieber et al. | Apr. 27, 1937 |
| 2,164,564 | Britton et al. | July 4, 1939 |
| 2,268,388 | Funk | Dec. 10, 1941 |